United States Patent
Jang et al.

(10) Patent No.: US 10,255,079 B2
(45) Date of Patent: Apr. 9, 2019

(54) INTEGRATED CIRCUIT DEVICE INCLUDING WAKE-UP CONTROL CIRCUIT AND ELECTRONIC DEVICE INCLUDING THE SAME

(71) Applicant: Samsung Electronics Co., Ltd., Suwon-si (KR)

(72) Inventors: Jaehyeok Jang, Incheon (KR); Yae Seul Lee, Seongnam-si (KR); Sang-Yong Park, Suwon-si (KR); Tae Sun You, Siheung-si (KR); Seong Wook Hwang, Seoul (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 124 days.

(21) Appl. No.: 15/394,518

(22) Filed: Dec. 29, 2016

(65) Prior Publication Data

US 2018/0004541 A1    Jan. 4, 2018

(30) Foreign Application Priority Data

Jul. 1, 2016   (KR) ........................ 10-2016-0083289

(51) Int. Cl.

| G06F 9/00 | (2006.01) |
|---|---|
| G06F 9/4401 | (2018.01) |
| G06F 1/3287 | (2019.01) |
| G06F 13/24 | (2006.01) |
| G06F 13/40 | (2006.01) |
| G06F 13/42 | (2006.01) |

(52) U.S. Cl.
CPC .......... *G06F 9/4418* (2013.01); *G06F 1/3287* (2013.01); *G06F 13/24* (2013.01); *G06F 13/4022* (2013.01); *G06F 13/4291* (2013.01)

(58) Field of Classification Search
CPC ............................. G06F 1/3287; G06F 9/4418
See application file for complete search history.

(56) References Cited

U.S. PATENT DOCUMENTS

| 6,079,022 A | 6/2000 | Young |
|---|---|---|
| 6,799,233 B1 | 9/2004 | Deshpande et al. |
| 6,954,810 B2 | 10/2005 | Delaney |
| 7,562,172 B2 | 7/2009 | Deshpande |
| 7,587,539 B2 | 9/2009 | Picard et al. |

(Continued)

FOREIGN PATENT DOCUMENTS

| JP | 2001117546 | 4/2001 |
|---|---|---|
| JP | 2013221962 | 10/2013 |

(Continued)

*Primary Examiner* — Zachary K Huson
(74) *Attorney, Agent, or Firm* — Muir Patent Law, PLLC

(57) ABSTRACT

An integrated circuit device is provided. The integrated circuit device may include a central processing unit (CPU) configured to operate in one of a plurality of modes and a wake-up control circuit configured to control the CPU. The wake-up control circuit may include a clock generator configured to generate an internal clock signal, a multiplexer configured to select a signal from among an external signal and the internal clock signal and to provide the CPU with the selected signal as an operating clock signal, and a controller configured to control the CPU and the clock generator based on the external signal.

18 Claims, 11 Drawing Sheets

(56) References Cited

U.S. PATENT DOCUMENTS

| | | | |
|---|---|---|---|
| 7,818,593 | B2 | 10/2010 | Goma et al. |
| 8,352,642 | B2 | 1/2013 | Hsu et al. |
| 8,452,897 | B1 | 5/2013 | Fernald et al. |
| 8,509,859 | B2 | 8/2013 | Jarosinski et al. |
| 8,819,466 | B2 | 8/2014 | Hartwich |
| 8,892,798 | B2 | 11/2014 | Tailliet et al. |
| 9,152,598 | B2 | 10/2015 | Fosse et al. |
| 2004/0045330 | A1* | 3/2004 | Moon ................ E05B 47/0673 70/107 |
| 2006/0034611 | A1 | 2/2006 | Li |
| 2010/0146169 | A1 | 6/2010 | Flachs |
| 2012/0079160 | A1* | 3/2012 | Iyer ........................ G06F 13/36 710/311 |
| 2012/0221753 | A1 | 8/2012 | Hartwich |
| 2012/0303768 | A1* | 11/2012 | Fiennes .............. H04N 21/4126 709/220 |
| 2013/0103970 | A1 | 4/2013 | Tang et al. |
| 2014/0115366 | A1* | 4/2014 | Joo .......................... G06F 1/06 713/323 |
| 2014/0337553 | A1 | 11/2014 | Du et al. |
| 2015/0234773 | A1 | 8/2015 | Sengoku |
| 2016/0018868 | A1 | 1/2016 | Shimada |

FOREIGN PATENT DOCUMENTS

| | | |
|---|---|---|
| KR | 1020040034747 A | 4/2004 |
| KR | 1020120064445 A | 6/2012 |
| KR | 1020150079318 A | 7/2015 |

\* cited by examiner

FIG. 2

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

INTEGRATED CIRCUIT DEVICE INCLUDING WAKE-UP CONTROL CIRCUIT AND ELECTRONIC DEVICE INCLUDING THE SAME

CROSS-REFERENCE TO RELATED APPLICATIONS

This application claims priority under 35 U.S.C. § 119(a) to Korean Patent Application No. 10-2016-0083289 filed on Jul. 1, 2016, the disclosure of which is hereby incorporated by reference in its entirety.

BACKGROUND

Embodiments of the present disclosure relate to an integrated circuit device and an electronic device including the same, and more particularly, to an integrated circuit device capable of waking up without a reference clock signal in a low-power mode and an electronic device including the same.

An integrated circuit device used in an electric device may usually operate in either a normal mode for a normal operation or a low-power mode for saving power. Here, the low-power mode may include an initialization mode and a sleep mode.

A stimulus is needed to wake up the integrated circuit device in the low-power mode. The stimulus may be an internal interrupt or an external input. The integrated circuit device may use a reference clock signal in order to react to this stimulus. However, when the reference clock signal is used, a clock tree and monitoring logic in the integrated circuit device partially operate, increasing power consumption of the integrated circuit device. Therefore, it is desirable to wake up the integrated circuit device from the low-power mode without using the reference clock signal for reducing the power consumption of the integrated circuit device.

SUMMARY

According to some embodiments of the inventive concept, there is provided an integrated circuit device including a central processing unit (CPU) configured to operate in one of a plurality of modes and a wake-up control circuit configured to control the CPU. The wake-up control circuit includes a clock generator configured to generate an internal clock signal, a multiplexer configured to select a signal from among an external signal and the internal clock signal and to provide the CPU with the selected signal as an operating clock signal, and a controller configured to control the CPU and the clock generator based on the external signal.

According to other embodiments of the inventive concept, there is provided an electronic system including an electronic device and at least one integrated circuit device connected to the electronic device through an inter integrated circuit (I2C) interface. The at least one integrated circuit device includes a CPU configured to operate in one of a plurality of modes, a clock generator configured to generate an internal clock signal, a controller configured to control the CPU and the clock generator by receiving serial data and a serial clock signal, and a multiplexer configured to select either the serial clock signal or the internal clock signal and to provide the CPU with the selected signal as an operating clock signal. The controller may compare an identification (ID) received from the electronic device with an address of the at least one integrated circuit device.

According to further embodiments of the inventive concept, there is provided an integrated circuit device including a CPU configured to operate in one of a plurality of modes and a controller configured to control an operation of the CPU based on serial data and a serial clock signal. The controller includes a detecting circuit configured to detect a start flag using the serial data and the serial clock signal and to generate a detection signal based on a detection result and a flip-flop circuit configured to renew a wake-up signal based on the detection signal.

According to still further embodiments of the inventive concept, there is provided an electronic device including an integrated circuit device. The integrated circuit device may include a central processing unit (CPU) configured to selectively operate in a low-power mode and a normal mode, a controller connected to an interface bus, and configured to receive an input signal through the interface bus and generate a wake-up signal when a count value of edges of the input signal reaches a first reference value in the low-power mode of the CPU, and a clock generator configured to generate an internal clock signal in the normal mode of the CPU. The CPU is configured to start a wake-up sequence based on the wake-up signal and the input signal, operate in the normal mode based on the internal clock signal, and operate in the low-power mode based on the input signal.

BRIEF DESCRIPTION OF THE DRAWINGS

The above and other features and advantages of the inventive concept will become more apparent by describing in detail exemplary embodiments thereof with reference to the attached drawings in which:

FIG. 2 is a diagram of the plug structure of an interface implemented as a universal serial bus (USB) type-C plug according to some example embodiments of the inventive concept;

DETAILED DESCRIPTION

The inventive concept now will be described more fully hereinafter with reference to the accompanying drawings, in which embodiments of the invention are shown.

It will be understood that, although the terms first, second, third etc. may be used herein to describe various elements, these elements should not be limited by these terms. Unless indicated otherwise, these terms are generally used to distinguish one element from another. Thus, a first element discussed below in one section of the specification could be termed a second element in a different section of the specification without departing from the teachings of the present disclosure. Also, terms such as "first" and "second" may be used in the claims to name an element of the claim, even thought that particular name is not used to describe in connection with the element in the specification. As used herein, the term "and/or" includes any and all combinations of one or more of the associated listed items. Expressions such as "at least one of," when preceding a list of elements, modify the entire list of elements and do not modify the individual elements of the list.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. For example, items described as "substantially the same," "substantially equal," or "substantially planar," may be exactly the same, equal, or planar, or may be the same, equal, or planar within acceptable variations that may occur, for example, due to manufacturing processes.

The disclosure of Universal Serial Bus Type-C Cable and Connector Specification Revision 1.1 published on Apr. 3, 2015, is incorporated by reference in its entirety. Accordingly, the terms and their descriptions in the Revision 1.1 are the same as those described herein unless otherwise defined. Also, the disclosure of inter integrated circuit (I2C) bus specification and user manual published on Apr. 4, 2014, is incorporated by reference in its entirety. Accordingly, the terms and their descriptions in the manual are the same as those described herein unless otherwise defined.

Figure 1:
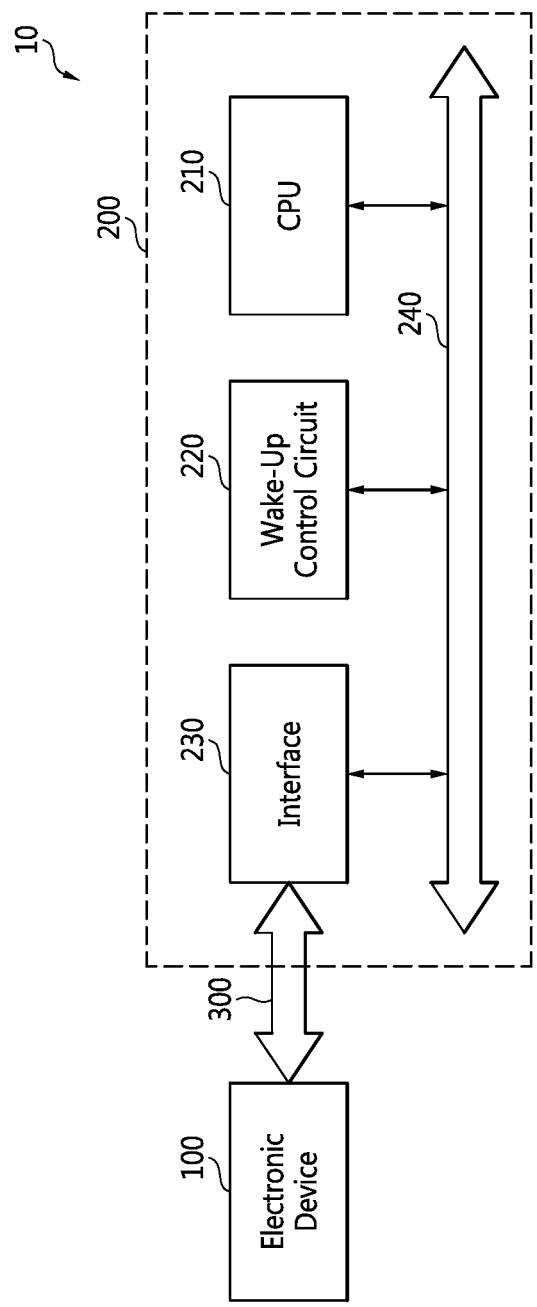
FIG. 1 is a block diagram of an electronic system according to some example embodiments of the inventive concept.

FIG. 1 is a block diagram of an electronic system 10 according to some example embodiments of the inventive concept.

An electronic system as used herein may refer to products that include devices such as an electronic device or an integrated circuit device. An electronic device as used herein may refer to a device that includes associated integrated circuit devices.

Referring to FIG. 1, the electronic system 10 may include an electronic device 100, an integrated circuit device 200, and an interface bus 300. The electronic device 100 may be connected to the integrated circuit device 200 through the interface bus 300.

The first electronic device 100 may be a master device and the integrated circuit device 200 which may be a second electronic device may be a slave device. On the other hand, the integrated circuit device 200 may be a master device and the electronic device 100 may be a slave device.

The electronic device 100 may be implemented as a personal computer (PC), a charger, a storage device, or a mobile device. The electronic device 100 may be implemented by the integrated circuit device 200 and other integrated circuit devices. The structure of the electronic device 100 may be the same as or similar to that of the integrated circuit device 200. The mobile device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, a drone, or an e-book.

The integrated circuit device 200 may include a central processing unit (CPU) 210, a wake-up control circuit 220, an interface 230, and a bus 240. Although not shown, the electronic device 100 or the integrated circuit device 200 may also include a memory device. The integrated circuit device 200 may be implemented, for example, as an application processor (AP), a power management integrated circuit, an image signal processor (ISP), a display controller, a memory controller, a touch pad controller, or a modem. The integrated circuit device 200 may also include a battery. The integrated circuit device 200 may also include a semiconductor memory device such as a memory device, one or more logic devices or memory cells formed in or on a semiconductor substrate, a semiconductor chip, a memory chip, a memory die, a logic chip, a package, a package including one or memory chips and optionally one or more logic chips, or combinations thereof. A semiconductor memory device may comprise a package which may include one or more chips stacked on a package substrate, or a package-on-package device including a plurality of packages.

The CPU 210, the wake-up control circuit 220, the interface 230, and the bus 240 may be integrated into a system on chip (SoC). Although it is described herein that the CPU 210 operates in a low-power mode (or, a sleep mode) or a normal mode, it may mean that the integrated circuit device 200 operates in a low-power mode or a normal mode. The CPU 210 may control the wake-up control circuit 220, the interface 230, and the bus 240. The low-power mode and the normal mode herein described may be referred according to different power consumption of a particular circuit or a particular device. For example, in the low-power mode, a particular device may consume about 1/10 the current it does running normally (i.e., operate in the normal mode). The low-power mode also may be referred to as a sleep mode or a power saving mode.

The wake-up control circuit 220 may wake up the CPU 210 or control a clock signal applied to the CPU 210 based on signals received from the interface 230. The wake-up control circuit 220 may also control the clock signal applied to the CPU 210 based on a signal received from the CPU 210. The details will be described later. The wake-up control circuit 220 may be integrated with the interface 230 in other example embodiments. Hereinafter, a wake-up operation (or, a wake-up sequence) refers to an operation of the integrated circuit device 200 entering the normal mode from the low-power mode and a low-power operation refers to an operation of the integrated circuit device 200 entering the low-power mode from the normal mode.

The interface 230 may communicate with the electronic device 100 through the interface bus 300. In detail, the interface 230 may receive a clock signal or data from the electronic device 100 or may transmit a clock signal or data to the electronic device 100.

The memory device collectively or conceptually indicates a volatile memory device and a non-volatile memory device. The volatile memory device includes random access memory (RAM), dynamic RAM (DRAM), and/or static RAM (SRAM). The non-volatile memory includes read-only memory (ROM) and/or flash memory.

The power management integrated circuit may supply an operating voltage or power to the CPU 210, the wake-up control circuit 220, the interface 230, and the bus 240. The power management integrated circuit may include voltage regulators, e.g., low drop out (LDO) voltage regulators. The battery is a rechargeable battery and may provide a voltage for the power management integrated circuit. The battery may be implemented as a flexible battery.

The interface bus 300 may include a plurality of lines for transmitting data or clock signals. The interface bus 300 may be implemented as a universal serial bus (USB) full-featured type-C standard cable assembly, a USB 2.0 type-C cable assembly, a USB type-C to USB 3.1 standard-A cable assembly, a USB type-C to USB 2.0 standard-A cable assembly, a USB type-C to USB 3.1 standard-B cable assembly, a USB type-C to USB 2.0 standard-B cable assembly, a USB type-C to USB 2.0 mini-B cable assembly, a USB type-C to USB 3.1 micro-B cable assembly, or a USB type-C to USB 2.0 micro-B cable assembly; but the inventive concept is not restricted to these examples. The interface bus 300 may also be implemented using a data line and a clock line according to I2C standards, but the inventive concept is not restricted to the current embodiments.

When the electronic device 100 is a charger, the electronic device 100 may be used as a power source and the integrated circuit device 200 may be used as a power sink. When the integrated circuit device 200 is used as a storage device, the integrated circuit device 200 may be implemented as a solid state drive or solid state disk (SSD), a universal flash storage (UFS), or a hard disk drive (HDD); but the inventive concept is not restricted to these examples.

FIG. 2 is a diagram of the plug structure of the interface 230 implemented as a USB type-C plug according to some example embodiments of the inventive concept. Referring to FIGS. 1 and 2, the interface 230 may include a plurality of pins A1 through A12 and B1 through B12. The name and description of a signal related with each of the pins A1 through A12 and B1 through B12 are disclosed in the USB type-C Cable and Connector Revision 1.1. Thus, the descriptions thereof will be omitted.

Figure 3:
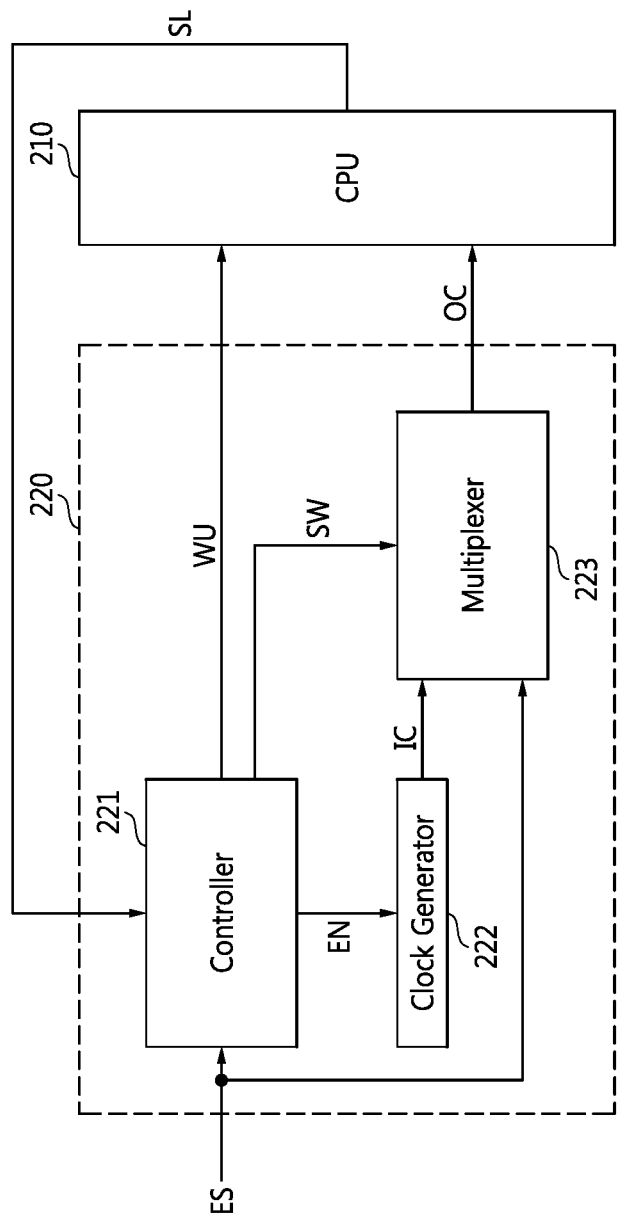
FIG. 3 is a block diagram of a wake-up control circuit according to some example embodiments of the inventive concept.

FIG. 3 is a block diagram of the wake-up control circuit 220 according to some example embodiments of the inventive concept. Referring to FIGS. 1 and 3, the wake-up control circuit 220 may control the CPU 210 to operate in either the low-power mode or the normal mode according to an external signal ES and a low-power signal SL. The external signal ES may be input from the electronic device 100 through the interface bus 300. The low-power signal SL may be output from the CPU 210. The wake-up control circuit 220 may output a wake-up signal WU and an operating clock signal OC to the CPU 210 based on the external signal ES and the low-power signal SL.

In detail, the wake-up control circuit 220 may determine whether the CPU 210 enters the normal mode based on the external signal ES. When the CPU 210 enters the normal mode, the wake-up control circuit 220 may generate an internal clock signal IC as the operating clock signal OC. In addition, the wake-up control circuit 220 may enable the wake-up signal WU to be transmitted to the CPU 210. The wake-up control circuit 220 may convert the operating clock signal OC from the external signal ES to the internal clock signal IC.

The wake-up control circuit 220 may determine whether the CPU 210 is entered the low-power mode based on the low-power signal SL received from the CPU 210. When the CPU 210 enters the low-power mode, the wake-up control circuit 220 may convert the operating clock signal OC from the internal clock signal IC to the external signal ES. In addition, the wake-up control circuit 220 may disable the wake-up signal WU transmitted to the CPU 210 and may stop generating the internal clock signal IC.

Referring to FIG. 3, the wake-up control circuit 220 may include a controller 221, a clock generator 222, and a multiplexer 223. For clarity of the description, the CPU 210 is illustrated together with the wake-up control circuit 220.

The controller 221 may function as a finite state machine (FSM) or a start flag detector. The details thereof will be described later. The controller 221 may receive the external signal ES from the electronic device 100. The controller 221 may determine whether the CPU 210 enters the normal mode based on the external signal ES.

In example embodiments, a case where the controller 221 functions as an FSM will be described. At this time, the external signal ES may be biphase mark code or bipolar mark code (BMC) data resulting from encoding of data using a BMC. The BMC data has different toggling according to a bit. For instance, the BMC data may be encoded so that the BMC data toggles with a full period when a data value is 1 and toggles with a half period when the data value is 0. The controller 221 may count edges of the external signal ES and may determine whether the CPU 210 enters the normal mode according to the count result.

In example embodiments, a case where the controller 221 functions as a start flag detector will be controller 221 described. At this time, the external signal ES may include a serial clock signal SCL or serial data SDA. The controller 221 may detect a start flag based on the external signal ES. The controller 221 may determine whether the CPU 210 enters the normal mode based on the detection result. The details will be described later.

When the CPU 210 enters the normal mode, the controller 221 may output a clock enable signal EN to the clock generator 222. For instance, the controller 221 may output the clock enable signal EN to the clock generator 222 when a count value obtained by counting edges of the external signal ES reaches a first reference value. The controller 221 may start counting edges of the external signal ES when the CPU 210 enters the low-power mode. The controller 221 may then enable the wake-up signal WU to control the CPU 210. For instance, when the count value reaches a second reference value, the controller 221 may enable the wake-up signal WU to control the CPU 210. The second reference value may be greater than the first reference value.

In addition, the controller 221 may control the multiplexer 223 by outputting a switch signal SW to the multiplexer 223 so that the operating clock signal OC is converted from the external signal ES to the internal clock signal IC. For instance, when the count value reaches a third reference value, the controller 221 may output the switch signal SW to the multiplexer 223 to convert the operating clock signal OC applied to the CPU 210 to the internal clock signal IC, thereby controlling the multiplexer 223. For example, the controller 221 may enable the switch signal SW. The third reference value may be greater than the second reference value.

The controller 221 may receive the low-power signal SL from the CPU 210. The controller 221 may determine whether the CPU 210 is entered the low-power mode based on the low-power signal SL received from the CPU 210. When the CPU 210 enters the low-power mode, the controller 221 may control the multiplexer 223 by outputting the switch signal SW to the multiplexer 223 to convert the operating clock signal OC from the internal clock signal IC to the external signal ES. For example, the controller 221 may disable the switch signal SW. The controller 221 may also disable the wake-up signal WU transmitted to the CPU 210. The controller 221 may not output the clock enable signal EN to the clock generator 222, but the inventive concept is not restricted to the current embodiments.

The clock generator 222 may generate and output the internal clock signal IC to the multiplexer 223 according to the clock enable signal EN. In example embodiments, the clock generator 222 may be an oscillator. The multiplexer 223 may select either the internal clock signal IC or the external signal ES according to the switch signal SW and may provide the selected signal as the operating clock signal OC for the CPU 210. For instance, the multiplexer 223 may select the internal clock signal IC when the switch signal SW is at a high level and may select the external signal ES when the switch signal SW is at a low level. However, the inventive concept is not restricted to the current embodiments.

In example embodiments, the external signal ES may be data or a clock signal. Each of the data or the clock signal of the external signal ES may have a regular pattern (e.g., same period) or a random pattern (e.g., different period).

In example embodiments, if a frequency of the external signal ES is higher than a frequency of the internal clock signal IC the controller 221 may have a frequency divider configured to divide the frequency of the external signal ES. The frequency divider may generate a divided signal having a lower frequency than the external signal ES and output the divided signal to the multiplexer 223. Thus, the CPU 210 may reduce power consumption by using the divided signal instead of the external signal ES in the low-power mode.

Figure 4:
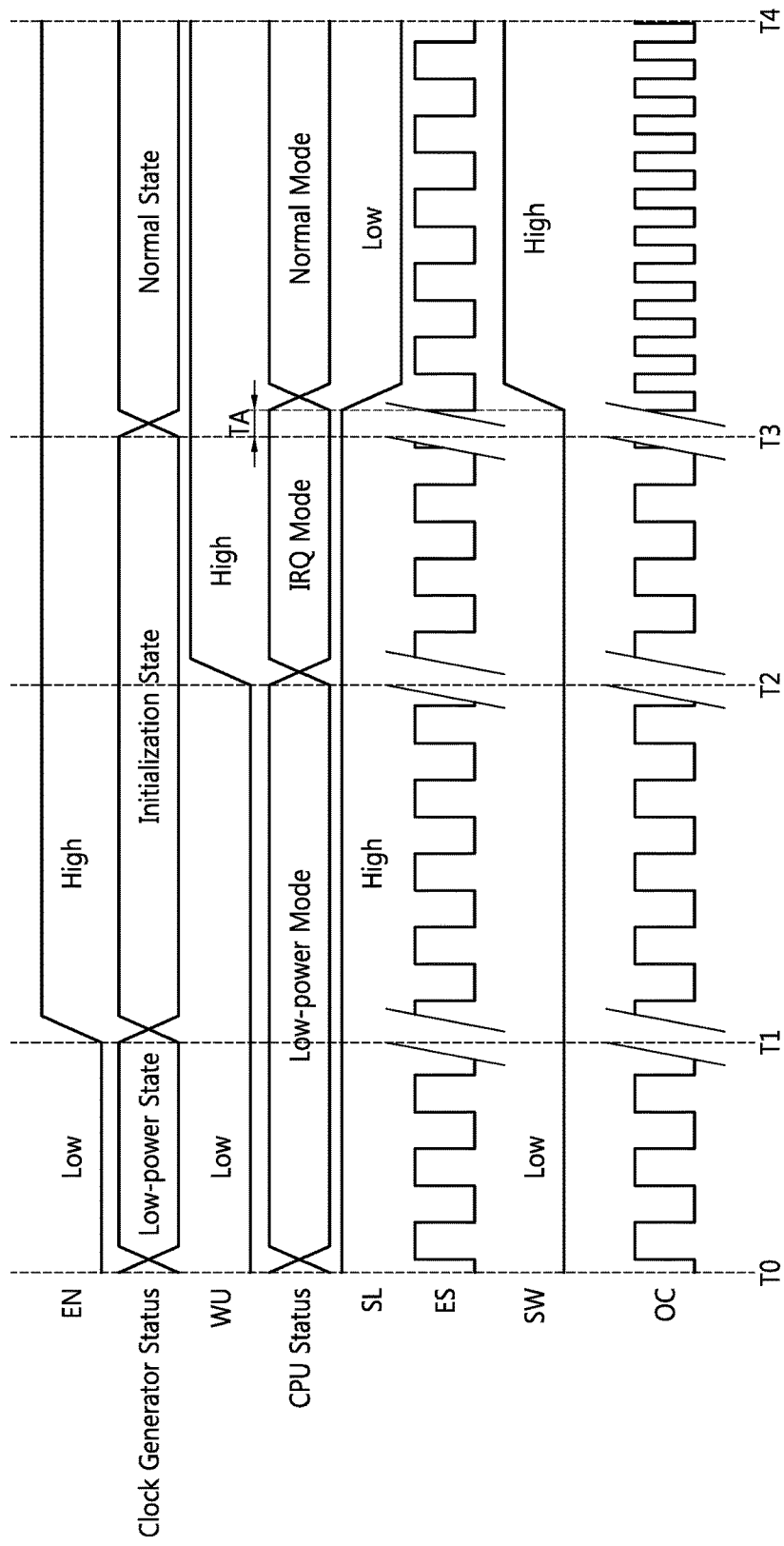
FIG. 4 is a timing chart showing the operation of the wake-up control circuit illustrated in FIG. 3 according to some example embodiments of the inventive concept.

FIG. 4 is a timing chart showing the operation of the wake-up control circuit 220 illustrated in FIG. 3 according to some example embodiments of the inventive concept. FIG. 4 shows a case where the controller 221 functions as an FSM. Referring to FIGS. 1, 3, and 4, since the clock enable signal EN is at a low level during a period T0 to T1, the clock generator 222 may operate in the low-power mode. In detail, the clock generator 222 may not generate the internal clock signal IC.

The wake-up signal WU may be at a low level. Accordingly, the operation mode of the CPU 210 may be the low-power mode and the low-power signal SL may be at a high level. Although the external signal ES toggles at regular intervals during a period T0 to T4 in the current embodiments, the inventive concept is not restricted to the current embodiments. If the integrated circuit device 200 is a USB power delivery (PD) device in example embodiments, the external signal ES may be BMC data and the wake-up control circuit 220 may detect a preamble of the BMC data by counting edges of the BMC data. The BMC data may have a regular period of pattern.

Also, the switch signal SW may be at the low level. Accordingly, the operating clock signal OC may be the external signal ES. The length of the period T0 to T1 may be changed.

Since the clock enable signal EN is at a high level during a period T1 to T2, the clock generator 222 may operate in an initialization state. For instance, the clock generator 222 may be in the initialization state before properly generating the internal clock signal IC. The wake-up signal WU may be at the low level. Accordingly, the operation mode of the CPU 210 may be the low-power mode and the low-power signal SL may be at the high level. The switch signal SW may be at the low level. Accordingly, the operating clock signal OC may be the external signal ES. The length of the period T1 to T2 may be changed.

Since the clock enable signal EN is at the high level during a period T2 to T3, the clock generator 222 may operate in the initialization state. For instance, the clock generator 222 may be in the initialization state before properly generating the internal clock signal IC. The wake-up signal WU may be at a high level. Accordingly, the operation mode of the CPU 210 may be an interrupt-request (IRQ) mode in which the CPU 210 temporarily stops a current task and processes input information first. The low-power signal SL may be at the high level. The switch signal SW may be at the low level. Accordingly, the operating clock signal OC may be the same as the external signal ES. The length of the period T2 to T3 may be changed.

Since the clock enable signal EN is at the high level during a period T3 to T4, the clock generator 222 may operate in the normal mode. For instance, the clock generator 222 may be in the normal mode in which the internal clock signal IC is properly generated. The wake-up signal WU may be at the high level. Accordingly, the CPU 210 may have stopped the IRQ mode and is in the normal mode and the low-power signal SL may be at the low level. The CPU 210 may enter the normal mode a predetermined time TA after the clock generator 222 starts to operate in the normal mode. However, the inventive concept is not restricted to the current embodiments.

The switch signal SW may be at the high level. Accordingly, the operating clock signal OC may be the internal clock signal IC. Although not shown in FIG. 4, a switching time during which the multiplexer 223 performs a switching operation may be required. The length of the period T3 to T4 may be changed.

In example embodiments, the wake-up signal WU automatically may transit to the low level after a predetermined of time in the normal mode of the CPU 210. In other example embodiments, the wake-up signal WU may transit to the low level based on the low-power signal SL at the high level.

Figure 5:
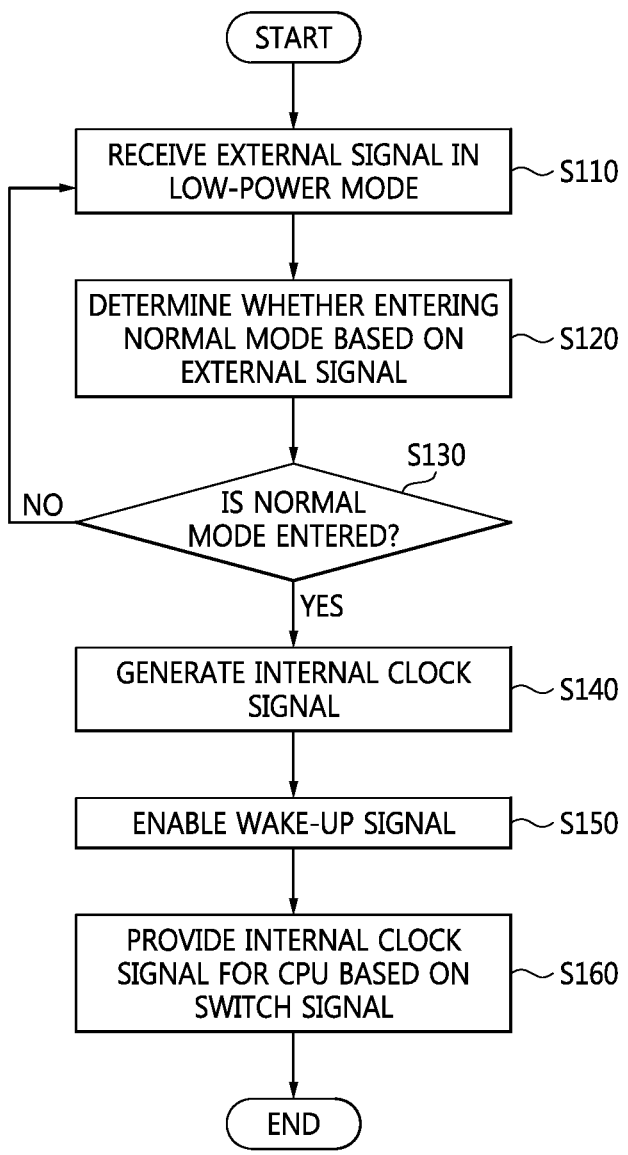
FIG. 5 is a flowchart of a procedure in which the wake-up control circuit illustrated in FIG. 3 enters a normal mode according to some example embodiments of the inventive concept.

FIG. 5 is a flowchart of a procedure in which the wake-up control circuit 220 illustrated in FIG. 3 enters the normal mode according to some example embodiments of the inventive concept. Referring to FIGS. 1, 3, and 5, the wake-up control circuit 220 may receive the external signal ES in the low-power mode in operation S110. The wake-up control circuit 220 may determine whether the CPU 210 enters the normal mode based on the external signal ES in operation S120.

When it is determined that the CPU 210 enters the normal mode (i.e., in case of YES) in operation S130, the wake-up control circuit 220 may generate the internal clock signal IC in operation S140. The wake-up control circuit 220 may enable the wake-up signal WU to the CPU 210 in operation S150. The wake-up control circuit 220 may provide the internal clock signal IC for the CPU 210 based on the switch signal SW in operation S160.

Figure 6:
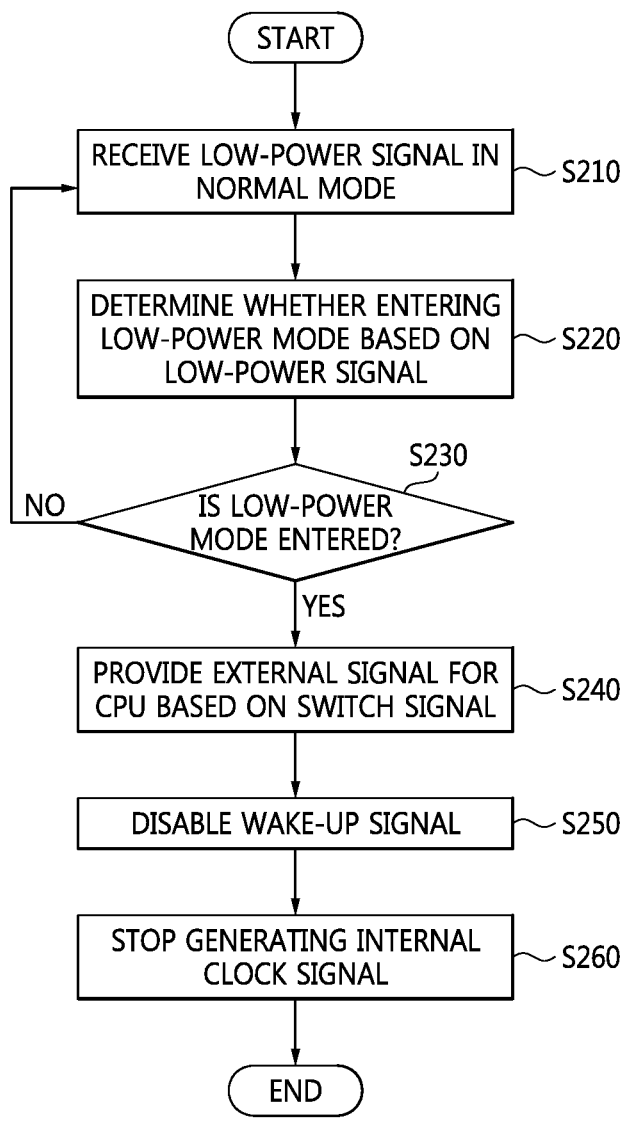
FIG. 6 is a flowchart of a procedure in which the wake-up control circuit illustrated in FIG. 3 enters a low-power mode according to some example embodiments of the inventive concept.

FIG. 6 is a flowchart of a procedure in which the wake-up control circuit 220 illustrated in FIG. 3 enters the low-power mode according to some example embodiments of the inventive concept. Referring to FIGS. 1, 3, and 6, the wake-up control circuit 220 may receive the low-power signal SL in the normal mode in operation S210. The wake-up control circuit 220 may determine whether the CPU 210 enters the low-power mode based on the low-power signal SL in operation S220.

When it is determined that the CPU 210 enters the low-power mode (i.e., in case of YES) in operation S230, the wake-up control circuit 220 may provide the external signal ES for the CPU 210 based on the switch signal SW in operation S240. The wake-up control circuit 220 may disable the wake-up signal WU and send the disabled wake-up signal WU to the CPU 210 in operation S250. The wake-up control circuit 220 may stop generating the internal clock signal IC in operation S260.

Figure 7:
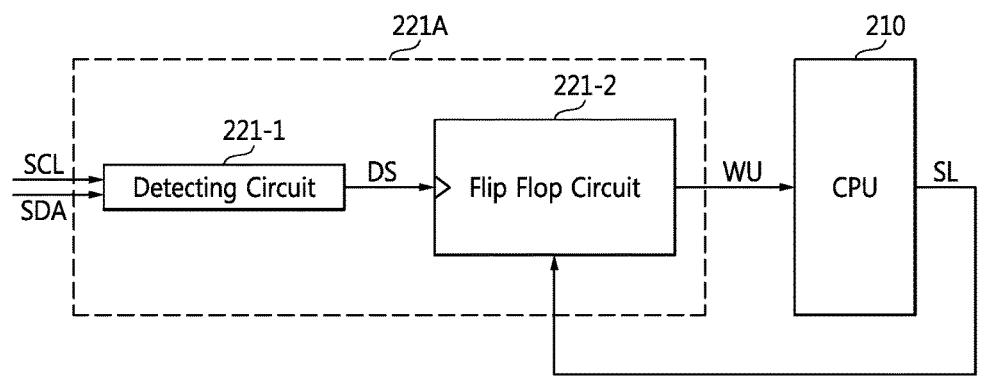
FIG. 7 is a block diagram of a controller illustrated in FIG. 3 according to some example embodiments of the inventive concept.

FIG. 7 is a block diagram of a controller 221A according to some example embodiments of the inventive concept. In the embodiments illustrated in FIG. 7, the controller 221A functions as a start flag detector. Referring to FIG. 7, the controller 221A may include a detecting circuit 221-1 and a flip-flop circuit 221-2. Although not shown in FIG. 7, the integrated circuit device 200 illustrated in FIG. 1 may communicate with the electronic device 100 through an I2C interface bus. The I2C interface bus may include two bidirectional open-drain lines. The bidirectional open-drain lines may include a line for the serial data SDA and a line for the serial clock signal SCL. Since the I2C interface bus may connect a plurality of devices through a data line, it may enable a half-duplex communication.

The detecting circuit 221-1 may receive the serial data SDA and the serial clock signal SCL from the electronic device 100. For example, the electronic device 100 may include the integrated circuit device 200 and one or more additional electronic integrated circuit devices. For instance, the electronic device 100 may be an AP.

The detecting circuit 221-1 may detect a start flag using the serial data SDA and the serial clock signal SCL. According to the I2C specification, the detecting circuit 221-1 may detect a start flag when the serial data SDA transits from a high level to a low level in a state where the serial clock signal SCL is at a high level. When the start flag is detected, the detecting circuit 221-1 may generate a detection signal DS. The detecting circuit 221-1 may generate the detection signal DS that may have the same period as the start flag. The details will be described with reference to FIG. 8 later. The detecting circuit 221-1 may output the detection signal DS to the flip-flop circuit 221-2.

The flip-flop circuit 221-2 may enable a wake-up signal WU, which has been stored therein, based on the detection signal DS. The flip-flop circuit 221-2 may also disable the wake-up signal WU, which has been stored therein, based on a low-power signal SL received from the CPU 210. The flip-flop circuit 221-2 may output the wake-up signal WU to the CPU 210.

The CPU 210 may enter the normal mode from the low-power mode according to the wake-up signal WU. In detail, the CPU 210 may enter the normal mode by starting a wake-up sequence when receiving the wake-up signal WU having the high level. On the contrary, when the CPU 210 enters the low-power mode, the CPU 210 may output the low-power signal SL to the flip-flop circuit 221-2 to reset the flip-flop circuit 221-2 and disable the wake-up signal WU.

Figure 8:
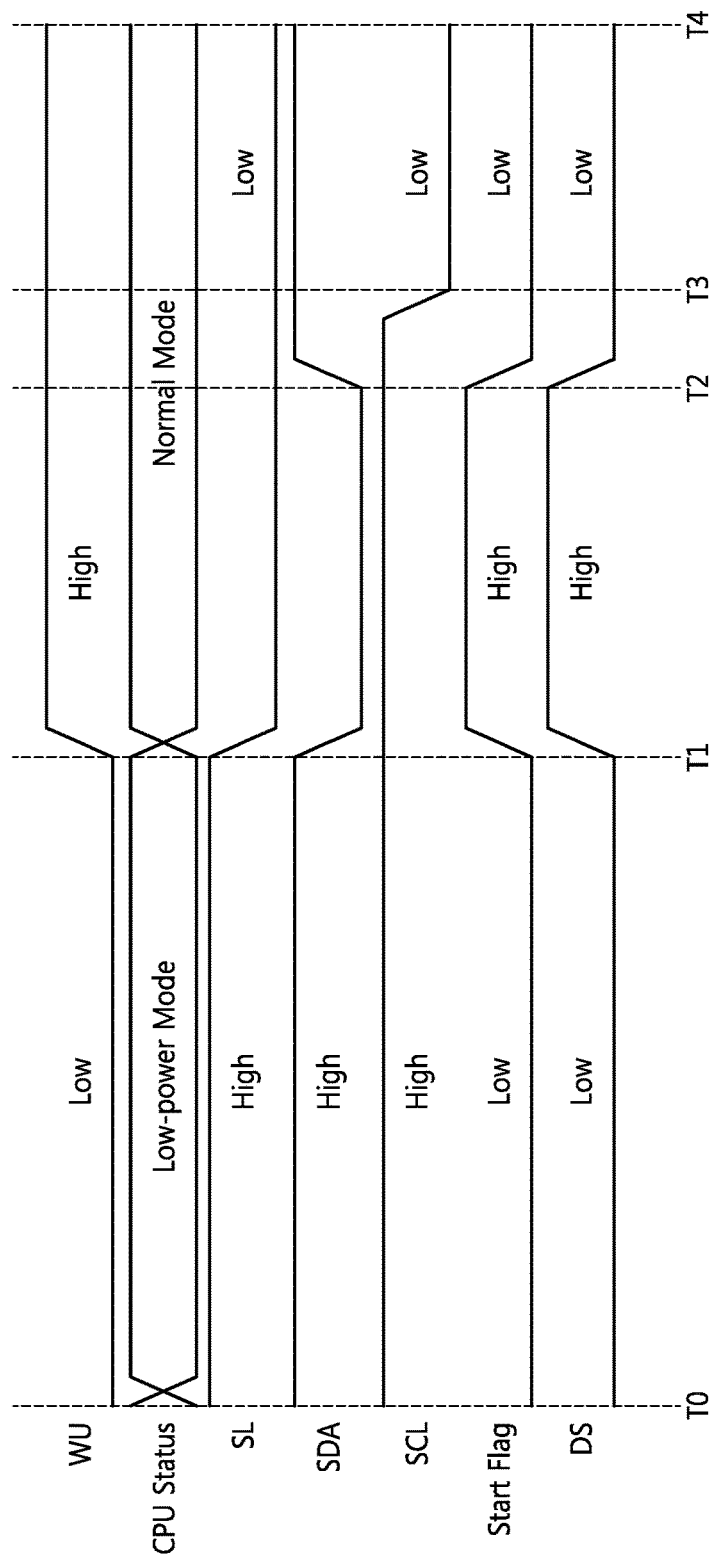
FIG. 8 is a timing chart showing the operation of the wake-up control circuit illustrated in FIG. 7 according to some example embodiments of the inventive concept.

FIG. 8 is a timing chart showing the operation of the wake-up control circuit 220 illustrated in FIG. 7 according to some example embodiments of the inventive concept. Referring to FIGS. 7 and 8, the wake-up signal WU may be at the low level in the period T0 to T1. Accordingly, the operation mode of the CPU 210 may be the low-power mode and the low-power signal SL may be at the high level. There would be no input, so that the serial data SDA and the serial clock signal SCL may be at a high level. The serial data SDA and the serial clock signal SCL may have been pulled up so that the start flag and the detection signal DS may be at a low level. As the serial data SDA transits from the high level to a low level at the point T1, the start flag may be detected.

The wake-up signal WU may be at the high level in the period T1 to T2. Accordingly, the operation mode of the CPU 210 may be the normal mode and the low-power signal SL may be at the low level. Since the serial data SDA is at the low level while the serial clock signal SCL is at the high level, the start flag may be at a high level. As the start flag is detected, the detection signal DS may be at a high level. As the serial data SDA transits to the high level at a point T2 while the serial clock signal SCL is at the high level, the start flag may transit to the low level.

The wake-up signal WU may continuously be at the high level in the period T2 to T3. Accordingly, the operation mode of the CPU 210 may be the normal mode and the low-power signal SL may be at the low level. The serial clock signal SCL may transit to the low level at a point T3, and the start flag may be at the low level. Accordingly, the detection signal DS may be at the low level.

The wake-up signal WU may continuously be at the high level in the period T3 to T4. Accordingly, the operation mode of the CPU 210 may be the normal mode and the low-power signal SL may be at the low level. The serial clock signal SCL may be at the low level and the start flag may be at the low level. Accordingly, the detection signal DS may be at the low level.

Figure 9:
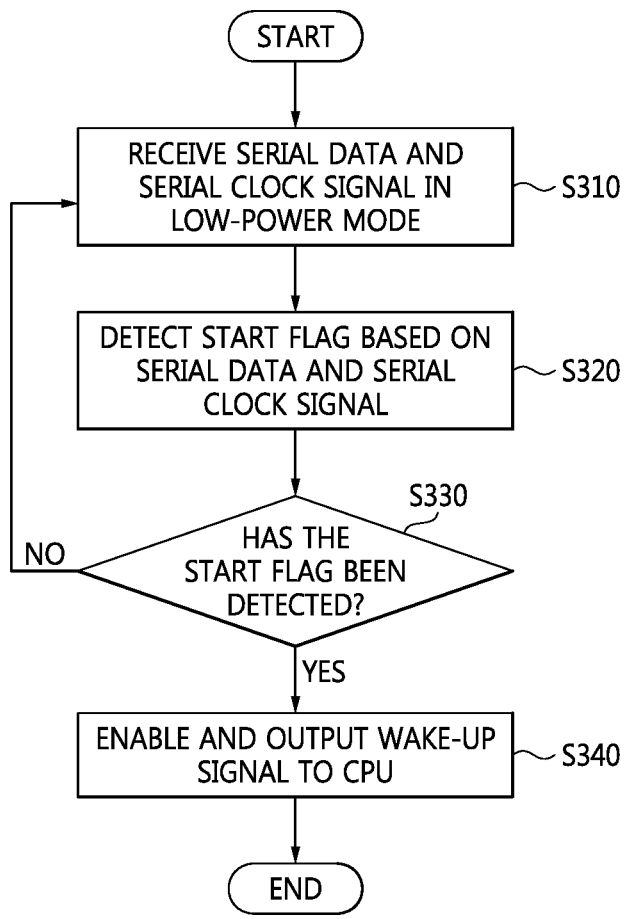
FIG. 9 is a flowchart of the operation of the wake-up control circuit illustrated in FIG. 7 according to some example embodiments of the inventive concept.

FIG. 9 is a flowchart of the operation of the wake-up control circuit 220 illustrated in FIG. 7 according to some example embodiments of the inventive concept. Referring to FIGS. 7 and 9, the controller 221A may receive the serial data SDA and the serial clock signal SCL in the low-power mode in operation S310. The controller 221A may detect a start flag based on the serial data SDA and the serial clock signal SCL in operation S320. For instance, the controller 221A may determine that a start flag has been generated and detect the start flag when the serial data SDA transits from the high level to the low level while the serial clock signal SCL is at the high level.

When the start flag is detected (i.e., in case of YES) in operation S330, the controller 221A may enable and output the wake-up signal WU to the CPU 210 in operation S340.

Figure 10:
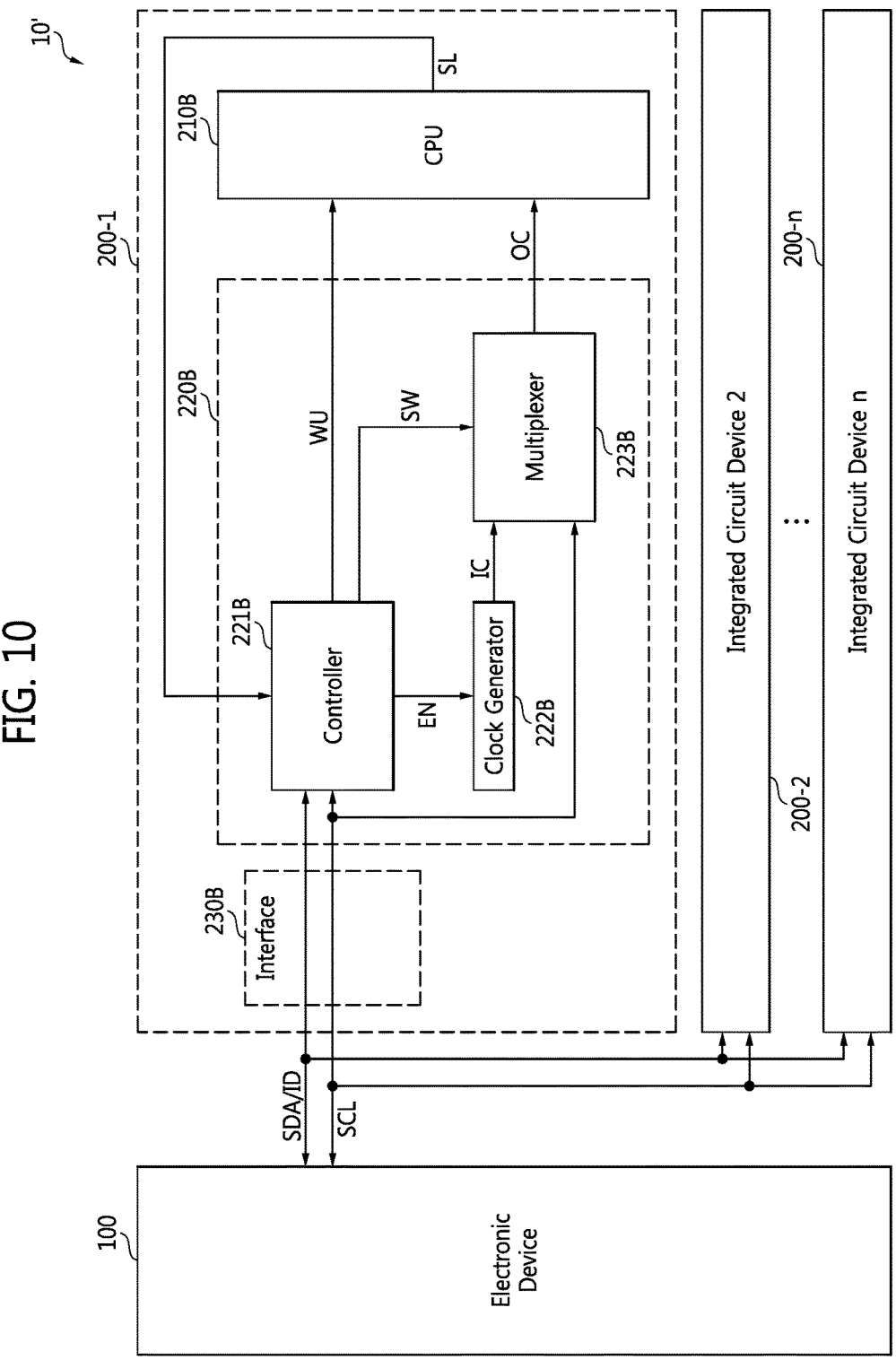
FIG. 10 is a block diagram of an electronic system according to some example embodiments of the inventive concept.

FIG. 10 is a block diagram of an electronic system 10' according to some example embodiments of the inventive concept. Referring to FIG. 10, the electronic system 10' may include the electronic device 100 and a set of integrated circuit devices 200-1 through 200-n. However, the inventive concept is not restricted to the current embodiments and the electronic system 10' may include a plurality of semiconductor devices in example embodiments. The set of integrated circuit devices 200-1 through 200-n may be connected with the electronic device 100 through an I2C interface bus.

The electronic device 100 may be connected to the set of integrated circuit devices 200-1 through 200-n through an I2C interface bus, but it may communicate with only one of the set of integrated circuit devices 200-1 through 200-n at a time. The electronic device 100 may be implemented as a PC, a charger, a storage device, or a mobile device. The electronic device 100 may be implemented by the integrated circuit device 200 and other integrated circuit devices. The structure of the electronic device 100 may be the same as or similar to that of the integrated circuit device 200. The mobile device may be a laptop computer, a cellular phone, a smart phone, a tablet PC, a PDA, an EDA, a digital still camera, a digital video camera, a PMP, a PND, a MID, a wearable computer, an IoT device, an IoE device, a drone, or an e-book.

Although only the first integrated circuit device 200-1 will be explained for convenience' sake in the description below, the set of integrated circuit devices 200-1 through 200-*n* may have substantially the same structure. Referring to FIG. 10, the first integrated circuit device 200-1 may include a CPU 210B, a wake-up control circuit 220B, and an interface 230B.

The CPU 210B may control the operation of the first integrated circuit device 200-1. The wake-up control circuit 220B and the interface 230B may be integrated together.

The wake-up control circuit 220B may control the first integrated circuit device 200-1 to operate in either the low-power mode or the normal mode according to an identification (ID), the serial data SDA, and the serial clock signal SCL which have been received from the electronic device 100 and the low-power signal SL received from the CPU 210B. The serial data SDA and the serial clock signal SCL may be data and a clock signal which are used in an I2C interface bus system. The ID may be address information of each of the set of integrated circuit devices 200-1 through 200-*n*.

The wake-up control circuit 220B may determine whether the ID is the same as the address of the first integrated circuit device 200-1. When the ID is the same as the address of the first integrated circuit device 200-1, the wake-up control circuit 220B may operate normally. However, when the ID is not the same as the address of the first integrated circuit device 200-1, the wake-up control circuit 220B may not perform the wake-up operation.

A controller 221B may perform ID matching after determining whether the operation mode of the CPU 210B is changed in order to wake up only a target slave device (e.g., the first integrated circuit device 200-1) in the electronic system 10' which includes a plurality of slave devices (e.g., the set of integrated circuit devices 200-1 through 200-*n*). In detail, the controller 221B of each of the plurality of slave devices may compare an identification (ID) received from the electronic device 100 with an address of each of the plurality of slave devices. Thus, the controller of the matched slave device may generate the wake-up signal WU to start a wake-up sequence of the CPU 210B of the matched slave device. Hereinafter, it is assumed that the ID is the same as the address of the first integrated circuit device 200-1.

The wake-up control circuit 220B may determine whether the CPU 210B enters the normal mode based on the serial data SDA and the serial clock signal SCL. When the CPU 210B enters the normal mode, the wake-up control circuit 220B may generate the internal clock signal IC. The wake-up control circuit 220B may also enable and output the wake-up signal WU to the CPU 210B. In addition, the wake-up control circuit 220B may convert the operating clock signal OC applied to the CPU 210B from the serial clock signal SCL to the internal clock signal IC.

The wake-up control circuit 220B may determine whether the CPU 210B enters the low-power mode based on the low-power signal SL received from the CPU 210B. When the CPU 210B enters the low-power mode, the wake-up control circuit 220B may convert the operating clock signal OC applied to the CPU 210B from the internal clock signal IC to external signal ES. The wake-up control circuit 220B may also disable and output the wake-up signal WU to the CPU 210B. The wake-up control circuit 220B may stop generating the internal clock signal IC. However, the inventive concept is not restricted to the current embodiments.

The wake-up control circuit 220B may include the controller 221B, a clock generator 222B, and a multiplexer 223B. The controller 221B may receive the serial data SDA, the serial clock signal SCL, and the ID from the electronic device 100 through the I2C interface bus. As described above, the controller 221B may control the wake-up control circuit 220B to operate only the first integrated circuit device 200-1 when the ID is the same as the address of the first integrated circuit device 200-1.

The clock generator 222B may generate the internal clock signal IC based on the clock enable signal EN and output the internal clock signal IC to the multiplexer 223B. The multiplexer 223B may select either the internal clock signal IC or the serial clock signal SCL based on the switch signal SW and may transmit the selected signal to the CPU 210B as the operating clock signal OC. For example, the multiplexer 223B may select the internal clock signal IC when the switch signal SW is at the high level and may select the serial clock signal SCL when the switch signal SW is at the low level. However, the inventive concept is not restricted to the current embodiments.

The operation of the controller 221B may be implemented by detecting a start flag or counting the serial clock signal SCL. The two cases of the operation will be described below separately.

Firstly, when the controller 221B detects a start flag, the electronic device 100 may continuously provide the serial clock signal SCL for the integrated circuit device 200 by periodically repeating a read operation. The controller 221B may detect a start flag based on the serial data SDA and the serial clock signal SCL. For instance, the controller 221B may detect the start flag when the serial data SDA transits from the high level to the low level while the serial clock signal SCL is at the high level. When the start flag is detected, the controller 221B may enable the clock enable signal EN and output it to the clock generator 222B. After enabling and outputting the clock enable signal EN to the clock generator 222B, the controller 221B may enable the wake-up signal WU and output it to the CPU 210B. After enabling and outputting the wake-up signal WU to the CPU 210B, the controller 221B may output the switch signal SW to the multiplexer 223B. For example, the controller 221B may enable the switch signal SW.

Secondly, when the controller 221B counts edges of the serial clock signal SCL, the controller 221B may function as an FSM. The controller 221B may receive the serial clock signal SCL. The controller 221B may determine whether the CPU 210B enters the normal mode based on the serial clock signal SCL. For instance, the controller 221B may count edges of the serial clock signal SCL and may determine whether the CPU 210B enters the normal mode based on the count result.

When the CPU 210B enters the normal mode, the controller 221B may output the clock enable signal EN to the clock generator 222B. For instance, the controller 221B may enable and output the clock enable signal EN to the clock generator 222B when a count value obtained by counting edges of the serial clock signal SCL reaches a first reference value. At that time, the controller 221B may also enable the wake-up signal WU transmitted to the CPU 210B. The controller 221B may start counting edges of the serial clock signal SCL when the start flag outputs. For another example, when the count value reaches a second reference value, the controller 221B may enable the wake-up signal WU transmitted to the CPU 210B. The second reference value may be greater than the first reference value.

In addition, the controller 221B may control the multiplexer 223B by outputting the switch signal SW to the multiplexer 223B so that the operating clock signal OC is converted from the serial clock signal SCL to the internal clock signal IC. For instance, when the count value reaches a third reference value, the controller 221B may output the switch signal SW to the multiplexer 223B to convert the operating clock signal OC applied to the CPU 210B to the internal clock signal IC, thereby controlling the multiplexer 223B. In other words, the controller 221B may enable the switch signal SW. The third reference value may be greater than the second reference value.

The controller 221B may receive the low-power signal SL from the CPU 210B. The controller 221B may determine whether the CPU 210B enters the low-power mode based on the low-power signal SL received from the CPU 210B. When the CPU 210B enters the low-power mode, the controller 221B may control the multiplexer 223B by outputting the switch signal SW to the multiplexer 223B to convert the operating clock signal OC from the internal clock signal IC to the external signal ES. For example, the controller 221B may disable the switch signal SW. The controller 221B may also disable the wake-up signal WU transmitted to the CPU 210B. The controller 221B may disable or may not output the clock enable signal EN to the clock generator 222B, but the inventive concept is not restricted to the current embodiments.

Figure 11:
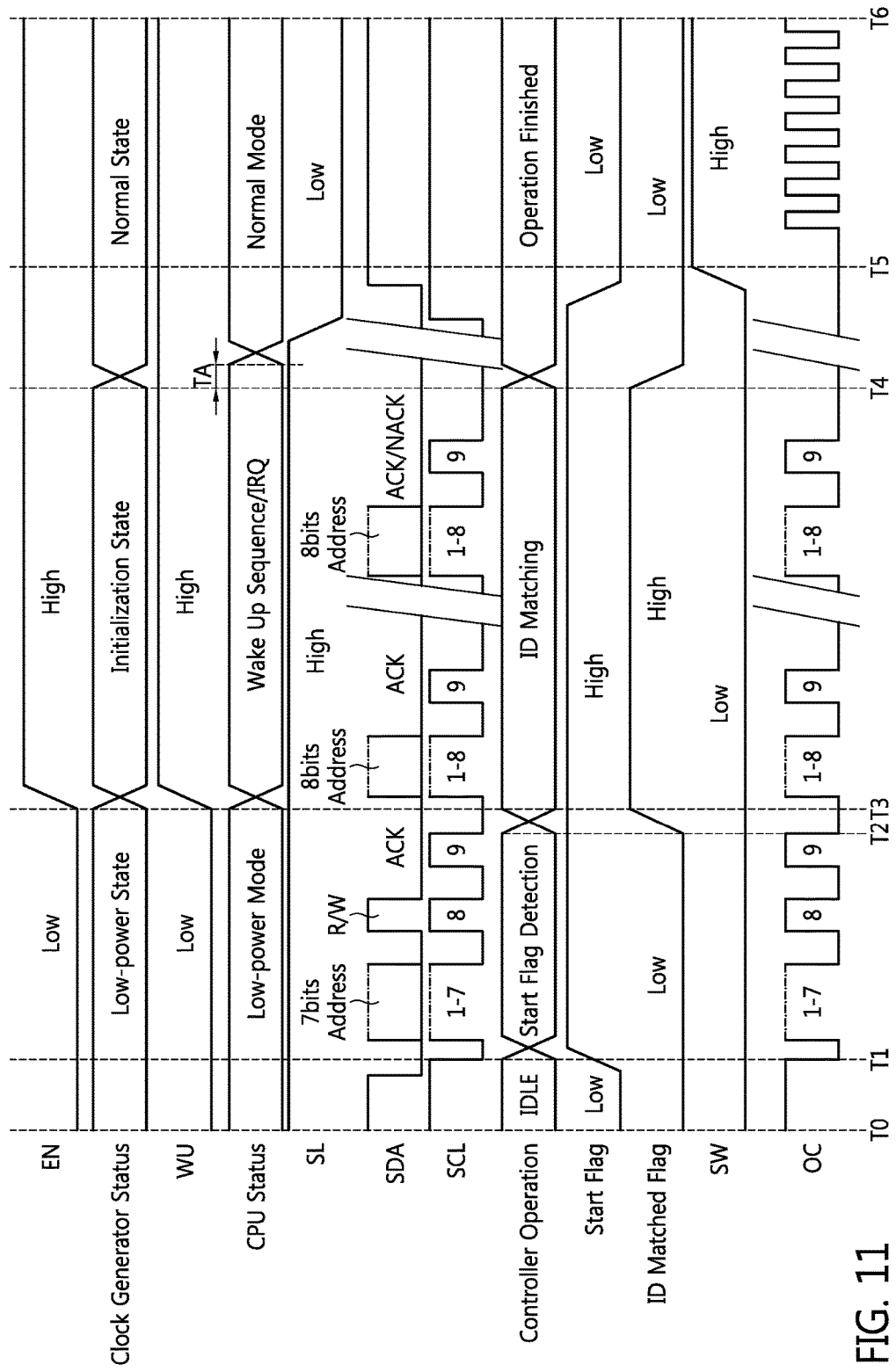
FIG. 11 is a timing chart showing the operation of the electronic system illustrated in FIG. 10 according to some example embodiments of the inventive concept.

FIG. 11 is a timing chart showing the operation of the electronic system 10' illustrated in FIG. 10 according to some example embodiments of the inventive concept. Although the description of the electronic system 10' below will be limited to a case where the controller 221B detects a start flag this is just for convenience' sake of the description and the inventive concept is not restricted to the current embodiments. In a case where the controller 221B counts edges of the serial clock signal SCL, the electronic system 10' may operate in a similar way to that described above with reference to FIGS. 1 through 6.

Referring to FIGS. 10 and 11, since the clock enable signal EN is at the low level during the period T0 to T1, the clock generator 222B may operate in the low-power mode. In detail, the clock generator 222B may not generate the internal clock signal IC.

The wake-up signal WU may be at the low level. Accordingly, the operation mode of the CPU 210 may be the low-power mode and the low-power signal SL may be at the high level. Although the waveforms of the serial data SDA and the serial clock signal SCL are schematically illustrated in FIG. 11 for convenience' sake, the inventive concept is not restricted to the current embodiments. When the serial clock signal SCL is at the high level, the serial data SDA may transit from the high level to the low level. In this case, as described above, the controller 221B may detect a start flag. As shown in FIG. 11, the start flag may be generated in the period T0 to T1 and may be detected by the controller 221B at the point T1. However, the inventive concept is not restricted to the current embodiments. Since the start flag is yet to be detected, an ID matched flag may be at a low level. The switch signal SW may be at the low level. Accordingly, the operating clock signal OC may be the same as the serial clock signal SCL. The length of the period T0 to T1 may be changed.

Since the clock enable signal EN is at the low level in a period T1 to T3, the clock generator 222B may operate in the low-power mode. In detail, the clock generator 222B may not generate the internal clock signal IC. The wake-up signal WU may be at the low level. Accordingly, the operation mode of the CPU 210B may be the low-power mode and the low-power signal SL may be at the high level. The serial clock signal SCL and the serial data SDA may be transmitted by, for example, nine bits. The first seven bits in the serial data SDA may refer to an information sequence, the eighth bit may indicate either a read operation or a write operation, and the ninth bit may indicate acknowledgement (ACK) or non-acknowledgement (NACK). The information sequence may be data transmitted to the first integrated circuit device 200-1 or the address of the first integrated circuit device 200-1. The address of the first integrated circuit device 200-1 may correspond to the ID.

The controller 221B may complete start flag detection at the point T2. At this time, the controller 221B may determine whether the ID is the same as the address of the first integrated circuit device 200-1. Accordingly, the ID matched flag may transit to a high level. The switch signal SW may be at the low level. Accordingly, the operating clock signal OC may be the same as the serial clock signal SCL. The length of the period T1 to T3 may be changed.

Since the clock enable signal EN is at the high level in a period T3 to T4, the clock generator 222B may operate in the initialization mode. In detail, the clock generator 222B may not properly generate the internal clock signal IC until the initialization mode ends. The wake-up signal WU may be at the high level. The operation mode of the CPU 210B may be a mode in which a wake-up sequence is performed or may be the IRQ mode and the low-power signal SL may still be at the high level. However, the inventive concept is not restricted to the current embodiments and the operating time points of signals may be changed.

The serial clock signal SCL and the serial data SDA may be transmitted by nine bits. For example, the information sequence of the serial data SDA is the address of the first integrated circuit device 200-1. Thus, the controller 221B may determine whether the ID is the same as the address of the first integrated circuit device 200-1. Accordingly, the ID matched flag may be at the high level. The switch signal SW may be at the low level, and therefore, the operating clock signal OC may be the same as the serial clock signal SCL. The length of the period T3 to T4 may be changed.

In example embodiments, the serial data SDA may be data in the period T1 to T3, and may be addresses in the period T3 to T4.

Since the clock enable signal EN is at the high level in a period T4 to T5, the clock generator 222B may operate in the normal mode after the initialization mode ends. In detail, the clock generator 222B may properly generate the internal clock signal IC. The wake-up signal WU may be at the high level. Accordingly, the CPU 210B may be in the normal mode and the low-power signal SL may be at the low level. The CPU 210B may enter the normal mode a predetermined time TA after the clock generator 222B starts operating in the normal mode. However, the inventive concept is not restricted to the current embodiments.

As shown in FIG. 11, when the serial clock signal SCL is at the high level, the serial data SDA may transit from the low level to the high level. In this case, the controller 221B may detect a stop flag. The stop flag is a concept opposite to the start flag and indicates that a slave device or a semiconductor device stops transmitting data through I2C interface. As shown in FIG. 11, the stop flag may be generated in the period T4 to T5. However, the inventive concept is not restricted to the current embodiments.

The controller 221B may operate when the ID is the same as the address of the first integrated circuit device 200-1 and may not operate when the ID is not the same as the address of the first integrated circuit device 200-1. Here, it is assumed that the ID is the same as the address of the first integrated circuit device 200-1.

As the stop flag has been generated, the start flag may transit from the high level to the low level. As the ID match is terminated at the point T4, the ID matched flag may be at the low level. The switch signal SW may be at the low level, and therefore, the operating clock signal OC may be the same as the serial clock signal SCL. The length of the period T4 to T5 may be changed.

Since the clock enable signal EN is at the high level in a period T5 to T6, the clock generator 222B may operate in the normal mode. In detail, the clock generator 222B may properly generate the internal clock signal IC. The wake-up signal WU may be at the high level. Accordingly, the CPU 210B may be in the normal mode and the low-power signal SL may be at the low level. The serial clock signal SCL and the serial data SDA may stay in the pulled-up state.

In example embodiments, the wake-up signal WU automatically may transit to the low level after a predetermined of time in the normal mode of the CPU 210. In other example embodiments, the wake-up signal WU may transit to the low level based on the low-power signal SL at the high level.

Since the ID is the same as the address of the first integrated circuit device 200-1 according to the assumption described above, the controller 221B may output the switch signal SW enabled to the multiplexer 223B. According to the operation of the multiplexer 223B, the operating clock signal OC may be converted from the serial clock signal SCL to the internal clock signal IC.

When the ID is not the same as the address of the first integrated circuit device 200-1, the switch signal SW may stay in a disabled state. In this case, the multiplexer 223B may not operate and the operating clock signal OC may be maintained as the serial clock signal SCL. The length of the period T5 to T6 may be changed.

As described above, according to some embodiments of the inventive concept, an integrated circuit device stops generating an internal clock signal in a low power mode, thereby decreasing power consumption. In other words, a wake-up control circuit and an AP including the same decrease static current consumed in the low-power mode and prolong the life of a battery that supplies power to the AP. In addition, the integrated circuit device does not need a separate ball mapping and general-purpose input/output (GPIO) multiplexer for receiving an external wake-up signal, thereby reducing the price of products. The integrated circuit device uses a start flag of an I2C as the wake-up signal, thereby enabling a quick wake-up operation.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An integrated circuit device comprising:
   a central processing unit (CPU) configured to operate in one of a plurality of modes; and
   a wake-up control circuit configured to control the CPU, the wake-up control circuit comprising:
      a clock generator configured to generate an internal clock signal,
      a multiplexer configured to select a signal from among an external signal and the internal clock signal and to provide the CPU with the selected signal as an operating clock signal, and
      a controller configured to control the CPU and the clock generator based on the external signal, count edges of the external signal and generate a clock enable signal to activate the clock generator when a count value of the controller reaches a first reference value, and output a wake-up signal to the CPU when the count value of the controller reaches a second reference value greater than the first reference value such that an operation of the CPU changes from a first mode to a second mode the plurality of modes according to the wake-up signal,
      wherein the clock generator is configured to generate the internal clock signal based on the clock enable signal and output the internal clock signal to the multiplexer.

2. The integrated circuit device of claim 1, wherein the controller is configured to function as a finite state machine (FSM) and count edges of the external signal.

3. The integrated circuit device of claim 1, wherein the controller is further configured to output a switch signal to the multiplexer when the count value of the controller reaches a third reference value greater than the second reference value such that the multiplexer selects the internal clock signal according to the switch signal and provides the CPU the selected signal as the operating clock signal.

4. The integrated circuit device of claim 3, wherein the first and second reference values are set based on an interrupt-request (IRQ) time of the CPU and an initialization time of the clock generator.

5. The integrated circuit device of claim 3, wherein the second and third reference values are set based on an interrupt-request (IRQ) time of the CPU, an initialization time of the clock generator, and a switching time of the multiplexer.

6. The integrated circuit device of claim 1, wherein the plurality of modes include a first mode and a second mode, and
   wherein the first mode is a low-power mode which decreases power consumption of an application processor and the second mode is a normal mode in which the application processor operates normally.

7. The integrated circuit device of claim 1, wherein the external signal has been encoded using bipolar mark code (BMC).

8. The integrated circuit device of claim 1, further comprising an interface implemented as a universal serial bus (USB) power delivery integrated circuit.

9. An electronic system comprising:
   an electronic device; and
   at least one integrated circuit device connected to the electronic device through an inter integrated circuit (I2C) interface, the at least one integrated circuit device comprising:
      a central processing unit (CPU) configured to operate in one of a plurality of modes,
      a clock generator configured to generate an internal clock signal, a controller configured to control the CPU and the clock generator by receiving serial data and a serial clock signal, and a multiplexer configured to select one of the serial clock signal and the internal clock signal and to provide the CPU with the selected signal as an operating clock signal, wherein the controller is configured to compare an identification (ID) received from the electronic device with an address of the at least one integrated circuit device.

10. The electronic system of claim 9, wherein the controller is further configured to detect a start flag generated based on the serial data and the serial clock signal.

11. The electronic system of claim 10, wherein the controller is further configured to, when the controller detects the start flag, generate a clock enable signal, and wherein the clock generator is configured to generate the internal clock signal according to the clock enable signal and output the internal clock signal to the multiplexer.

12. The electronic system of claim 11, wherein the controller is configured to, after the controller generates the clock enable signal generate a wake-up signal, and wherein the CPU is configured to start a wake-up sequence according to the wake-up signal.

13. The electronic system of claim 12, wherein the controller is configured to, after the controller generates the wake-up signal, generate a switch signal, and wherein the multiplexer is configured to select one of the serial clock signal and the internal clock signal according to the switch signal and provide the CPU with the selected signal as the operating clock signal.

14. The electronic system of claim 9, wherein the at least one integrated circuit device is continuously provided with the serial clock signal when a read operation of the electronic device is periodically repeated.

15. The electronic system of claim 9, wherein the controller is further configured to function as a finite state machine (FSM) and count edges of the serial clock signal.

16. The electronic system of claim 15, wherein the controller is configured to count edges of the serial clock signal and generate a clock enable signal to activate the clock generator when the count value of the controller reaches a first reference value, and wherein the clock generator is configured to generate the internal clock signal based on the clock enable signal and output the internal clock signal to the multiplexer.

17. The electronic system of claim 16, wherein the controller is configured to output a wake-up signal to the CPU when the count value of the controller reaches a second reference value such that an operation of the CPU changes from a first mode to a second mode of the plurality of modes according to the wake-up signal, and wherein the first mode is a low-power mode which decreases power consumption of the CPU and the second mode is a normal mode in which the CPU operates normally.

18. The electronic system of claim 17, wherein the controller is configured to output a switch signal to the multiplexer when the count value of the controller reaches a third reference value greater than the second reference value such that the multiplexer selects one of the serial clock signal and the internal clock signal according to the switch signal and provides the CPU the selected signal as the operating clock signal.

* * * * *